United States Patent [19]
Struger et al.

[11] 3,798,612
[45] Mar. 19, 1974

[54] CONTROLLER PROGRAMMER

[75] Inventors: Odo J. Struger; Joseph D. Radtke, both of Milwaukee, Wis.

[73] Assignee: Allen-Bradly Company, Milwaukee, Wis.

[22] Filed: Sept. 13, 1971

[21] Appl. No.: 179,982

[52] U.S. Cl. .................... 340/172.5, 235/153 AM
[51] Int. Cl. ............................................ G05b 11/00
[58] Field of Search .......... 340/172.5; 235/153 AH, 235/153 AM

[56] References Cited
UNITED STATES PATENTS

| | | | |
|---|---|---|---|
| 3,079,589 | 2/1963 | Mol et al. | 340/172.5 |
| 3,631,403 | 12/1971 | Asbo et al. | 340/172.5 |
| 3,656,131 | 4/1972 | Libby et al. | 340/172.5 |
| 3,659,275 | 4/1972 | Marshall | 340/172.5 |
| 3,665,426 | 5/1972 | Gross et al. | 340/172.5 |
| 3,345,611 | 10/1967 | Eachus | 340/172.5 |
| 3,623,020 | 11/1971 | Mao | 340/172.5 |
| 3,633,177 | 1/1972 | Caldwell | 340/172.5 |
| 3,012,723 | 12/1961 | Goertzel et al. | 340/172.5 |

*Primary Examiner*—Paul J. Henon
*Assistant Examiner*—Michael Sachs
*Attorney, Agent, or Firm*—Barry E. Sammons

[57] ABSTRACT

A program for a controller is loaded manually or by means of a tape reader into a plated wire, read-write memory contained within the programmer. The programmer operates the controller according to the instructions in the program and any changes necessary to perfect the program are made. A mode switch is then operated and the program is automatically transferred, one instruction at a time, through a transfer circuit to a read-only memory suitable for installation in the controller. The transfer is made in synchronism with a ten-phase clock and a check is made by a comparator to verify the proper loading of each instruction in the read-only memory.

7 Claims, 4 Drawing Figures

CONTROLLER PROGRAMMER

BACKGROUND OF THE INVENTION

The field of the invention is methods and apparatus for programming the memory units of controllers, and more specifically, means of programming the read-only memory of a controller such as that disclosed in the copending patent application Ser. No. 137,923, filed Apr. 27, 1971, and entitled "Programmable Matrix Controller."

Controllers such as that described in the above cited application perform complex control jobs in accordance with a stored program. The program is a set of instructions which directs the controller to examine the condition of various input devices such as motor starters, indicator lights, control valves and solenoids, compare these conditions to the conditions specified in the stored program, and accordingly, direct the controller to energize or deenergize selected output devices. The programs are derived from either a "ladder diagram," a logic diagram, or a set of Boolean expressions which are converted into machine language and entered into the memory unit of the controller. Although one of the most advantageous features of controllers such as that disclosed in the above cited patent application is the simplicity of their language, it is an important objective in this field to simplify and speed up the process of transferring solutions to control problems, as expressed by the control engineer, into the controller.

Additionally, when the controller is programmed and operated, problems often occur which require that the stored program be altered. Although in theory the program for the controller can be accurately determined without operating experience, in practice, changes in the program are often needed after the controller is operated on the job site in order to overcome unforeseen problems, or programming errors. Where "read-write" type memory units are used in the controller, such changes are relatively easy to make. However, "read-only" memories are often used to increase reliability and reduce the cost of the controller, and as a result, program changes may be difficult if not impossible to make.

Read-only memories are programmed by selectively and permanently "burning" or "fusing" elements arranged in a matrix. Each instruction of the program is stored in the read-only memory, by selectively burning elements in one line of the matrix. Although such stored instructions can be erased by burning, or fusing all the elements in the line, space must be left available throughout the matrix for the insertion of additional corrected instructions. In other words, in a read-only type memory, once a line is programmed it cannot be changed, it can only be erased. Unused and perhaps wasted storage capacity must, therefore, be left available throughout the memory matrix in the event new instructions are added to the program after the controller is operated under working conditions.

SUMMARY OF THE INVENTION

The present invention comprises a method and apparatus for temporarily operating a controller under working conditions in accordance with a proposed program, making changes in that program when necessary, and transferring the resulting program to the memory unit in the controller. The invented programmer circuit includes a read-write type memory connectable to the controller to operate the same in accordance with a program stored in it; an input unit connnected to the read-write memory and being adapted to both program the read-write memory in accordance with a set of input data and to make changes in that program in response to further input data; a transfer circuit connected to read the program stored in the read-write memory, and being adapted to transfer on command the program stored in the read-write memory to a memory unit to be used in the controller; and a central control circuit connected to the read-write memory, the input unit and the program transfer circuit; wherein the central control circuit operates the programmer circuit to either load a program into the read-write memory, to operate an attached controller in accordance with the program stored in the read-write memory, or to transfer the program from the read-write memory to a memory unit for use in the controller.

A general object of the invention is to provide a means for initially operating a controller in accordance with a program, making corrections to that program if necessary, and transferring the final program to a memory unit adapted for permanent use in the controller. A read-write memory is used as a "scratch pad" into which the initial program is loaded. A plated wire memory is used for this purpose, and although it is a relatively expensive memory unit, the program is easily loaded into it, changed, and erased. Thus, the controller can be operated in its actual environment by means of a program stored in a read-write memory, and when the program is perfected, it is transferred to a relatively inexpensive read-only memory unit which is then installed in the controller. The programmer circuit is detached from the controller and its read-write memory is erased to make it available for use with other controllers.

Another object of the invention is to provide a simplified means of loading a solution to a control problem into a controller memory unit; which soltuion is expressed in logic diagrams or Boolean equations. The input unit of the programmer circuit not only includes push buttons and thumbwheels for manually loading the read-write memory in the programmer circuit, but it is also adapted to load the read-write memory in response to data on punched paper tape. The punched tape can be made automatically by means of a digital computer which is programmed to translate logic diagrams, or Boolean equations directly into controller language.

The foregoing and other objects and advantages of the invention will appear from the following description. In the description reference is made to the accompanying drawings which form a part hereof, and in which there is shown by way of illustration and not of limitation a preferred embodiment. Such description does not represent the full scope of the invention, but rather the invention may be employed in different arrangements and reference is made to the claims herein for interpreting the breadth of the invention.

DESCRIPTION OF THE PREFERRED EMBODIMENT

Figure 1:
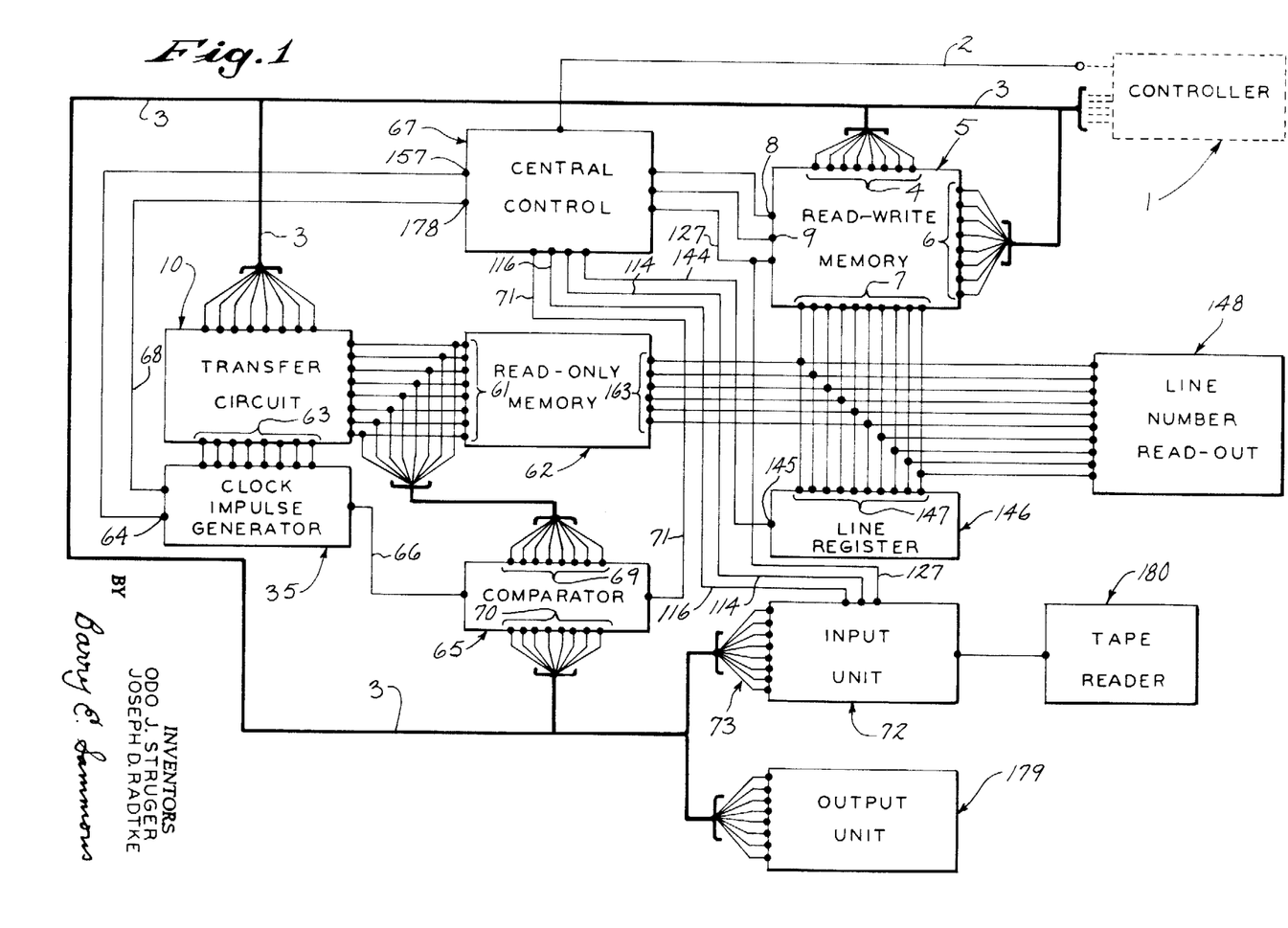
FIG. 1 is a block digram of the invented programmer circuit.

Referring to FIG. 1, the programmer circuit is shown connected to a controller 1 through a clock bus 2 and a data bus 3. The data bus 3 includes eight separate data lines each of which is connected to one of eight data write lines 4 on a read-write memory unit 5 located in the programmer circuit. Each data line is also connected to one of eight data read lines 6 on the read-write memory 5. The read-write memory 5 is a plated wire type memory such as that sold commercially under the trade name "Nemonic." It has a capacity for 1,024 eight-bit words. Each word occupies one line of memory and any one of the 1,024 lines can be "addressed" by the application of an appropriate ten-bit digital signal to 10 address terminals 7 on the memory unit 5. An instruction of the program is "loaded" or stored on a particular line in the read-write memory 5 by addressing that line through the address terminals 7, applying the instruction to the data write lines 4, applying a logic low voltage to a read/write terminal 8, and applying a logic high voltage to a memory initiate terminal 9. On the other hand, an instruction is "read out" of the read-write memory 5 by addressing the line on which it is stored, applying a logic high voltage to the read/write terminal 8, and applying a logic high voltage to the memory initiate terminal 9. The resulting eight-bit instruction read from the memory 5 appears on the data read lines 6 from which it is conveyed, depending upon the mode of operation, to either the controller 1 attached to the data bus 3, or a transfer circuit 10, also attached to the data bus 3.

Figure 2:
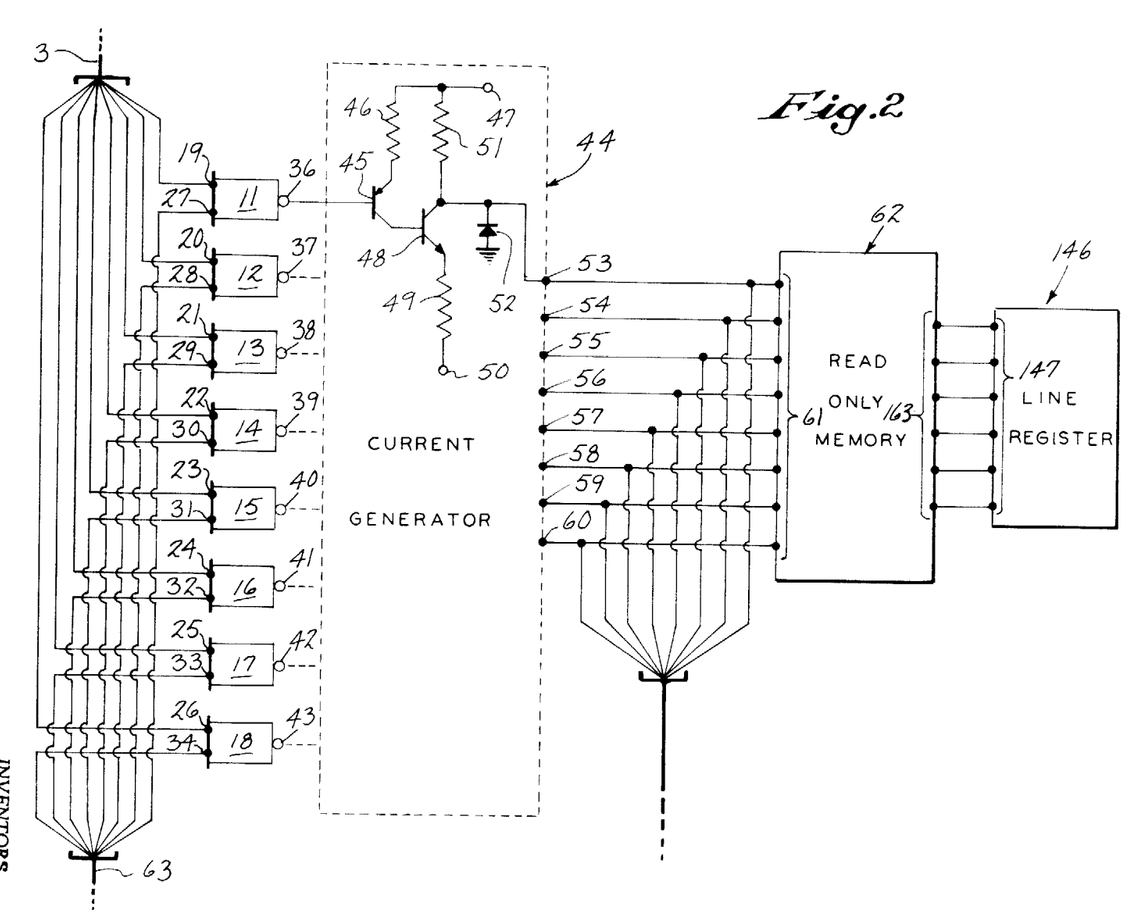
FIG. 2 is an electrical schematic diagram of the transfer circuit portion of the invented programmer circuit.

Referring to FIG. 2, the transfer circuit 10 includes eight NAND gates 11–18 each having a first input terminal 19–26, respectively, connected to one of the eight lines in the data bus 3. Each NAND gate 11–18 also has a second input terminal 27–34, respectively, each of which connects to a clock bus 63 leading to a ten-phase clock pulse generator 35. The NAND gates 11–18 are commercially available logic gates, each of which has an output terminal 36–43, respectively, that is held at a logic high voltage until a logic high voltage is applied to both its input terminals.

Each NAND gate output terminal 36–43 is connected to a current generator 44. The connection of each is identical, and for the sake of clarity, only the circuitry attached to the first NAND gate output terminal 36 is shown in FIG. 2. The first NAND gate output terminal 36 connects to the base of a PNP driver transistor 45, the emitter of which is connected through a current limit resistor 46 to a positive d-c supply terminal 47. The collector of the driver transistor 45 connects to the base of an NPN output transistor 48. The emitter of output transistor 48 connects through a second current limit resistor 49 to a negative d-c supply terminal 50, and its collector connects through a load resistor 51 to the positive d-c supply terminal 47. The collector of the output transistor 48 also connects through a clamping diode 52 to circuit ground and to a current generator output terminal 53. Identical circuits link the NAND gate output terminals 37–43 to seven additional currrent generator output terminals 54–60.

As shown in FIGS. 1 and 2, the output terminals 53–60 form the output terminals of the transfer circuit 10. They connect to eight input terminals 61 on a read-only memory matrix 62 of the type to be used in the controller 1. The programmer circuit described herein, and particularly the current generator 44, is adapted to program, or load a read-only memory matrix of the type used in the controller described in the above cited patent application. The memory matrix 62 has a capacity of 64 eight-bit words, each word occupying one line in the memory matrix 62 which is permanently programmed with one instruction. Any one of the lines can be "addressed" by the application of an appropriate six-bit digital signal to six address terminals 163.

Each instruction is loaded into the read-only memory matrix 62, one bit at a time. The appropriate line is addressed through the address terminals 163 and the eight elements (not shown in the drawing) in each line are selectively "burned" or "fused" by current pulses generated by the transfer circuit 10. Each instruction to be loaded into an addressed line of the read-only matrix 62 is generated on the data bus 3 and appears as an eight-bit digital signal at the NAND gate input terminals 19–26. The bits are transferred one at a time by the application of a series of clock pulses, one to each of the NAND gate input terminals 27–34. The bits of the eight-bit instruction appear in inverted form at the respective NAND gate output terminals 36–43, and the current generator 44 provides current amplification for each of these inverted bits of information and conveys the same to an input terminal 61 of the read-only memory matrix 62. For example, if the first two bits of an instruction on the data bus 3 are "1" and "0," respectively, a logic high voltage is applied to the first NAND gate input terminal 19 and a logic low voltage is applied to the second NAND gate input terminal 20. Transfer is initiated by a first logic high clock pulse generated to the first NAND gate input terminal 27. The resulting logic low at the first NAND gate output terminal 36 causes a logic low to be generated at the transfer circuit output terminal 53, and as a result, a "1" is permanently loaded into the addressed line of the memory matrix 62. When the first clock pulse terminates, a second clock pulse is immediately generated to the second NAND gate input terminal 28. Because its other input terminal 20 is at a logic low voltage, however, its output terminal 37 remains at a logic high voltage and the transfer circuit output terminal 54 likewise remains at a logic high voltage. As a result, the second bit in the addressed line of the read-only memory matrix 62 remains unburned, or in other words, "0." The remaining six bits of the instruction are loaded into the read-only memory matrix 62 in like manner by the succeeding six clock pulses.

The clock pulse generator 35 generates the first eight of its ten phase-displaced clock pulses to the transfer circuit 10. The clock pulse generator 35 is a commercially available circuit in which each clock pulse generated is 260 milliseconds in duration, and each is phase displaced such that the pulses occur in immediate succession. The clock pulse generator 35 is formed by connecting the outputs of a four-bit binary counter such as that sold under the trademark "Fairchild Model 93L10" and disclosed in the October, 1970 Fairchild Catalog with the four input terminals on a decoder such as that sold under the trademark "Fairchild Model 9301" and disclosed in the October, 1970 Fairchild Catalog. Referring to FIG. 1, when a logic high voltage is applied to an enabling terminal 64, the first eight clock pulses are generated through the clock bus 63 to the transfer circuit 10. The ninth clock pulse is unused, and the tenth clock pulse is applied to both a comparator circuit 65 through a lead 66, and to a central control circuit 67 through a lead 68.

The comparator circuit 65 is formed by combining two five-bit comparator circuits such as the model 9324 sold commercially under the trade name "Fairchild" and disclosed in the October, 1970 Fairchild Catalog. The comparator circuit 65 is a high speed expandible comparator which provides comparison between an eight-bit digital signal applied to a first set of input terminals 69 and an eight-bit digital signal applied to a second set of input terminals 70. The first set of comparator input terminals 69 are connected to the memory matrix input terminals 61 to read the instruction stored on the line being addressed at the time. The second set of comparator input terminals 70 are connected to the eight lines of the data bus 3 to read the eight-bit digital signal appearing thereon. This comparison is performed during the generation of the tenth clock pulse, the purpose being to insure that the instruction on the data bus 3 has been properly transferred into the read-only memory matrix 62 during the preceding nine clock pulses. If the instruction has been properly loaded into the memory matrix 62, a logic high voltage is generated by the comparator circuit 65 through an enable bus 71 to the central control 67 while the 10th clock pulse is being generated.

As shown in FIG. 1, the data which comprises the instructions of the program is inserted into the system by means of an input unit 72. Eight output lines 73 connect the input unit 72 to the lines in the data bus 3. The input unit 72 allows the insertion of the program by either of two means; manually, or automatically. The input unit 72 can be directly interfaced with a digital computer for automatic programming, or with telephone equipment for remote programming. As discussed in the above cited patent application, each instruction of the program for the controller 1 includes a two-bit operation code and a six-bit address code. Consequently, the preferred programmer circuit described herein is adapted to accommodate a program having four operations which shall be designed for the purpose of explanation as XIC, XIO, BRT and SET. In addition 64 distinct input-output addresses can be accommodated by the six-bit address code and shall be designated by the octal numbers 0–77.

Figure 4:
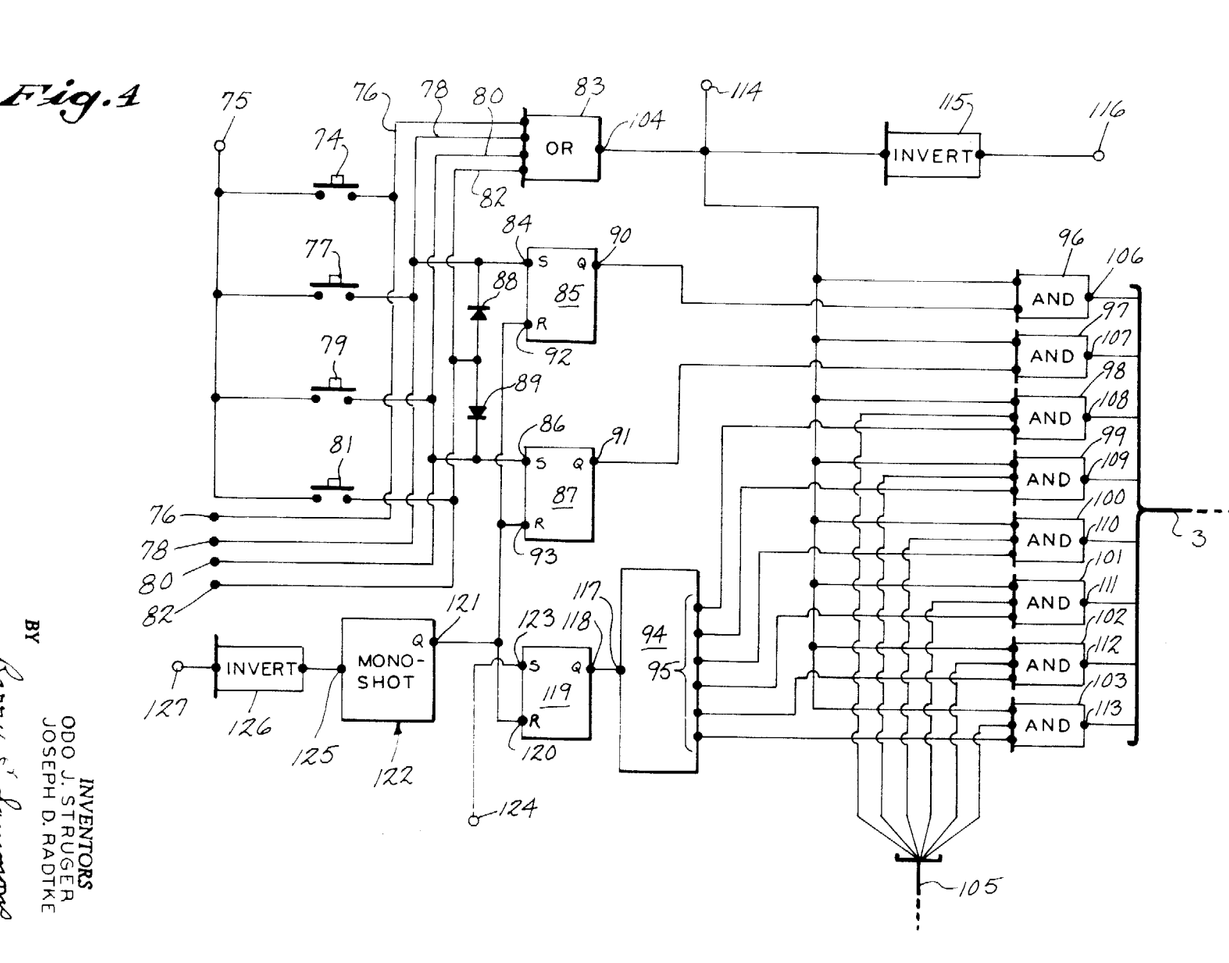
FIG. 4 is an electrical circuit diagram of the input unit of the invented programmer circuit.

Referring to FIG. 4, the input unit 7 includes an XIC push button switch 74 connected between a positive d-c supply terminal 75 and an XIC bus 76, an XIO push button switch 77 connected between the supply terminal 75 and an XIO bus 78, a BRT push button switch 79 connected between the terminal 75 and a BRT bus 80, and a SET push button switch 81 connected between the terminal 75 and a SET bus 82. The XIC bus 76 connects to an input terminal on a standard, commercially available OR gate 83. The XIO bus 78 also connects to an input terminal on the OR gate 83 and to an S terminal 84 on a first R-S flip-flop 85. The BRT bus 80 connects to an input terminal on the OR gate 83 and an S terminal 86 on a second R-S flip-flop 87. The SET bus 82 connects to another input terminal on the OR gate 83, through a first coupling diode 88 to the S terminal 84 on the first R-S flip-flop 85, and through a second coupling diode 89 to the S terminal 86 on the second R-S flip-flop 87. The R-S flip-flops 85 and 87 are commercially available circuits which are bistable in either a set or reset state. When set by the application of a logic high voltage to the S terminals 84 or 86, a logic high voltage is generated at Q terminals 90 or 91 on the respective flip-flops 85 and 87. A logic high voltage applied to an R terminal 92 on the first R-S flip-flop 85, resets it by driving Q terminal 90 to a logic low voltage. Likewise, the Q terminal 91 on the second R-S flip-flop 87 is driven to a logic low voltage when a logic high voltage is applied to an R terminal 93. The Q terminals 90 and 91 each connect to an input terminal on respective output AND gates 96 and 97.

The six-bit address code in each instruction is inserted by means of a rotary thumbwheel switch 94. When a pair of wheels (not shown in the drawings) are manually set to one of the octal numbers 0–77, a corresponding six-bit binary coded signal is generated at six output terminals 95. The six output terminals 95 each connect to an input terminal on one of six output AND gates 98–103. A second input terminal on each of the eight output AND gates 96–103 connects to an output terminal 104 on the OR gate 83. Each of the six output AND gates 98–103 has a third input terminal which connects to an address code bus 105 which in turn connects to a tape reader 180. Output terminals 106–113 on each of the eight respective output AND gates 96–103, connect to the data bus 3.

The output terminal 104 of the OR gate 83 connects to a start bus 114 and to the input terminal of an inverter circuit 115. The output terminal of the inverter circuit 115 connects to a write bus 116. The address thumbwheels 94 have an inhibit input terminal 117 connected to a Q terminal 118 on a third R-S flip-flop 119. The third R-S flip-flop 119 is similar to the R-S flip-flops 85 and 87 described above. It has an R terminal 120 connected to the R terminals 92 and 93 on the R-S flip-flops 85 and 87, which in turn connect to a Q terminal 121 on a monoshot circuit 122. R-S flip-flop 119 also has an S terminal 123 which connects to a tape reader bus 124. The monoshot circuit 122 is a commercially available circuit which generates a logic high voltage pulse of fixed duration at the Q terminal 121 when a positive voltage step is applied to an input terminal 125. The input terminal 125 is connected to the output of an inverter circuit 126, the input of which is connected to a memory busy bus 127. The memory busy bus 127 connects to the read-write memory 5 to receive a logic high voltage when the memory 5 is either reading or writing.

The input unit operates to generate an eight-bit digital signal to the data bus 3 in response to either a manual input from the push button switches 74–81 and address thumbwheels 94 or in response to signals applied to the address code bus 105, the XIC bus 76, the XIO bus 78, the BRT bus 80, and the SET bus 82. When operated manually, one of the push buttons 74–81 is depressed and a two-bit operation code is generated at the Q terminals 90 and 91 of the first and second flip-flop 85 and 87. Concurrently, a logic high is generated to one of the input terminals on the OR gate 83, causing its output terminal 104 to go high. This logic high is applied to the output AND gates 96 and 97, causing the operation code to be generated at the AND gate output terminals 106 and 107. The address code is generated by rotating the thumbwheels to the proper octal number. The resulting six-bit digital signal generated at the address thumbwheel output terminals 95 is applied to the output AND gates 98-103. When operating manually, the address code bus 105 is held at a logic high voltage, and therefore, when a push button is depressed and the logic high voltage generated at the OR gate output terminal 104, the six-bit address code appears at the AND gate output terminals 108-113. When the depressed push button is released, the logic high generated at the OR gate output terminal 104 terminates and the input unit 72 is effectively disconnected from the data bus 3 by the operation of the output AND gates 96-103. The address code for the next instruction can then be manually inserted by rotating the address thumbwheels 94 and depressing the accompanying operation code push button.

When operated in an automatic mode from the tape reader 180, the six-bit address code is inserted by means of the address code bus 105 and a logic high voltage is applied to the appropriate bus, 76, 77, 80 or 82. The tape reader 180 is a commercially available item such as the paper tape reader model 2166 sold under the trademark "MDS." A translator circuit (not shown) converts the instructions generated by the paper tape reader into operation signals and binary octal coded address signals for the input unit 72. Additionally, when operated in this mode, a logic high voltage is applied to the tape reader bus 124 to set the third R-S flip-flop 119. As a result, its Q terminal 118 goes high and a logic high is applied to the inhibit input terminal 117 on the address thumbwheels 94. The logic high corresponding to the operation code activates the first and second R-S flip-flops 85 and 87 and drive the OR gate output terminal 104 momentarily high. Consequently, the eight-bit instruction is momentarily applied to the data bus 3.

Figure 3:
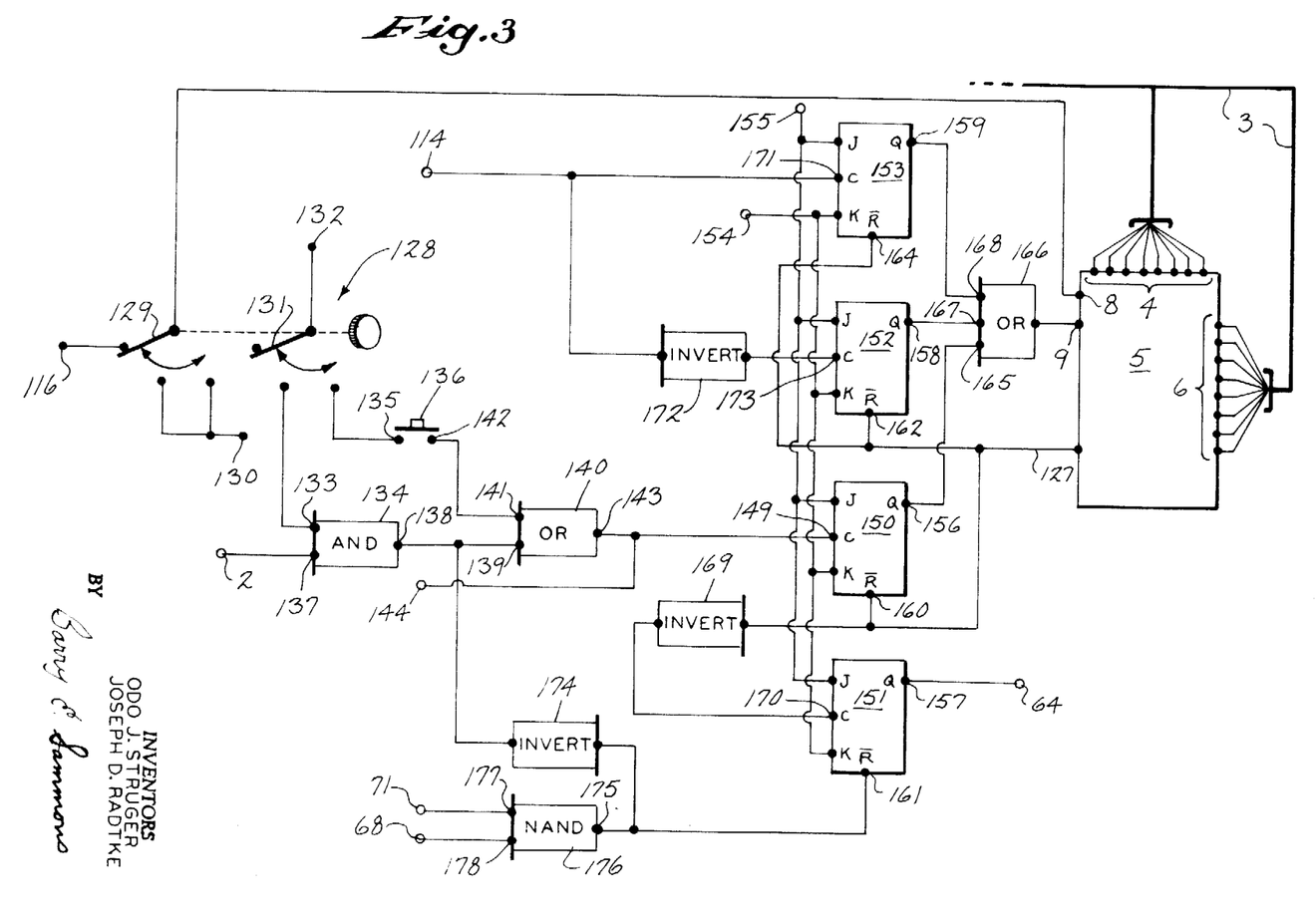
FIG. 3 is an electrical circuit diagram of the central control portion of the invented programmer circuit.

The circuitry thus far described serves to perform one of three distinct functions; load instructions generated on the data bus 3 into the read-write memory 5, operate the attached controller 1 according to the program stored in the read-write memory 5, and transfer the program stored in the read-write memory 5 to the read-only memory 62. The mode of operation is determined by a mode selector switch 128 located in the central control 67. Referring to FIG. 3, the mode switch 128 is a double pole, triple throw switch having a first wiper 129 connected to the read/write terminal 8 on the read-write memory 5. When rotated to the load position shown in FIG. 3, the wiper 129 joins the write bus 116 to the read/write terminal 8; when rotated to an operate position, it connects a positive d-c supply terminal 130 to the read/write terminal 8; and when rotated to a transfer position, the wiper 129 connects the positive d-c supply terminal 130 to the read/write terminal 8. The second pole of the mode selector switch 128 has a wiper 131 connected to a positive d-c supply terminal 132. When in the load position, the wiper 131 is non-functional; when rotated to the operate mode, it connects the positive supply terminal 132 to a first input terminal 133 on an AND gate 134; and when rotated to the transfer position, the wiper 131 connects the positive supply terminal 132 to a first terminal 135 on a normally open push button 136. A second input terminal 137 on the AND gate 134 connects to the clock bus 2 to receive clock pulses from the controller 1. An output terminal 138 on the AND gate 134 connects to a first input terminal 139 on an OR gate 140, and the OR gate 140 has a second input terminal 141 connected to a second terminal 142 on the normally open push button 136. An output terminal 143 on the OR gate 140 connects to a register bus 144.

Referring to FIG. 1, the register bus 144 connects to a clock terminal 145 on a line register 146. The line register is a 10-bit binary counter which is formed by connecting three commercially available four-bit binary counters together to generate a 10-bit binary output signal at 10 output terminals 147. The binary number thus generated increases one digit for each positive voltage step received at the clock terminal 145, or alternately, a specific binary number corresponding to a decimal number between 0 and 1024 can be directly inserted manually through the input 72. The ten output terminals 147 are connected directly to the address terminals 7 on the read-write memory 5 and to a line number readout circuit 148. The readout circuit 148 includes standard decoder circuits connected to provide a visual indication of the equivalent octal number being generated in binary form at the outputs 147. Additionally, the six least significant digit output terminals 147 are connected to the six address terminals 163 on the read-only memory 62.

Referring back to the central control circuit shown in FIG. 3, the OR gate output terminal 143 also connects to a clock terminal 149 on a first J-K flip-flop 150. The K terminal on the first J-K flip-flop 150 connects to the K terminals on a second J-K flip-flop 151, a third J-K flip-flop 152, and a fourth J-K flip-flop 153. Likewise, J terminals on each of the four flip-flops 150-153 are connected together. The K terminals are connected to a negative d-c supply terminal 154 and the J terminals are connected to a positive d-c supply terminal 155. The J-K flip-flops 150-153 are standard commercially available circuits which are bistable in either a reset or set state. When reset, respective Q terminals 156-159 are at a logic low voltage, but when the flip-flops 150-153 are set by a positive voltage step applied to their respective clock terminals, their Q terminals 156-159 change to a logic high voltage. Additionally, the J-K flip-flops 150-153 are reset by the application of a logic low voltage to respective direct reset terminals 160, 161, 162, and 164.

The Q terminal 156 on the first J-K flip-flop 150 connects to a first input terminal 165 on a second OR gate 166. The Q terminal 157 on the second J-K flip-flop 151 connects to the enabling terminal 64 of the clock pulse generator 35, the Q terminal 158 on the third J-K flip-flop 152 connects to a second input terminal 167 on the second OR gate 166, and the Q terminal 159 on the fourth J-K flip-flop 153 connects to a third input terminal 168 on the second OR gate 166. The output of the second OR gate 166 connects to the memory initiate terminal 9 on the read-write memory 5. Additionally, the direct reset terminals 160, 162, and 164 are connected to the memory busy bus 127, and through a first inverter circuit 169 to a clock terminal 170 on the second J-K flip-flop 151. A clock terminal 171 on the fourth J-K flip-flop 153 connects to the start bus 114 and through a second inverter circuit 172 to a clock terminal 173 on the third J-K flip-flop 152. The direct reset terminal 161 on the second J-K flip-flop 152 connects through a third inverter circuit 174 to the first OR gate input terminal 139, and directly to an output terminal 175 on a NAND gate 176. A first input terminal 177 on the NAND gate 176 connects to the enable bus 71 leading from the comparator circuit 65, and a second input terminal 178 connects to the lead 68 attached to the clock pulse generator 35.

As discussed above, the programmer circuit operates in one of three modes: to load a program into the read-write memory 5; to operate the controller 1 in accordance with the program stored in the read-write memory 5, and to transfer the program stored in the read-write memory 5 to the read-only memory matrix 62. First, to load the read-write memory 5, the mode selector switch 128 is set to the position shown in FIG. 3 in which the write bus 116 from the input unit 72 is connected to the read/write terminal 8 on the read-write memory 5. The line number to the programmed is manually dialed into the line register 146. Referring to FIGS. 3 and 4, the address code is also manually chosen by means of the thumbwheels 94, and the appropriate operation code is chosen by depressing one of the push buttons 74, 77, 79 or 81. As discussed above, when the selected push button is depressed, the selected instruction is generated to the data bus 3 and applied to the data write lines 4 on the read-write memory 5. Concurrently, a logic high is generated on the start bus 114 and a logic low is generated through the write bus 116 to the read/write terminal 8 on the read-write memory 5. A logic high on the start bus 114 clocks the fourth J-K flip-flop 153 causing a logic high voltage to be generated at its Q terminal 159 and through the second OR gate 166 to the memory initiate terminal on the read-write memory 5. Thus, when the selected push button 74, 77, 79 or 81 is depressed, the instruction is loaded into the addressed line of the read-write memory 5. When the selected push button in the input unit 72 is then released, a logic low is immediately generated on the start bus 114, and a logic high voltage is generated through the write bus 116 to the read/write terminal 8. The negative voltage step on the start bus 114 clocks the third J-K flip-flop 152, causing a logic high voltage to be generated at its Q terminal 158 and through the second OR gate 166 to the memory initiate terminal 9 on the read-write memory 5. As a result, the instruction loaded into the read-write memory 5 is immediately read out through the data read lines 6 to the data bus 3. The instruction read from the read-write memory 5 appears on the data bus 3 and is generated to an output unit 179 where it is decoded to provide a visual indication of the instruction which has been loaded. During read-out, the memory busy bus 127 is at a logic high voltage, however, when read-out is completed, the bus 127 changes to a logic low voltage which is applied to the direct reset terminals 162 and 164 to reset the third and fourth J-K flip-flops 152 and 153. The programmer circuit is then in condition to receive subsequent instructions which are to be loaded into the read-write memory 5. The output unit 179 is a light emitting diode readout display with associated decoder/driver such as that sold by the Dialight Corporation and disclosed in a 1971 brochure entitled "730 Series Solid State LED."

To operate the controller 1 by means of the program stored in the read-write memory 5, the mode selector switch 128 is rotated one position to connect the read/write terminal 8 with the positive voltage terminal 130, and the AND gate input terminal 133 with the positive voltage terminal 132. The controller 1, which is then turned on, commences to generate clock pulses through the clock bus 2 to the AND gate input terminal 137. Each clock pulses generates a logic high voltage through the first OR gate 140 to the clock terminal 149 of the first J-K flip-flop 150 and to the register bus 144 connected to the line register 146. As a result, lines in the read-write memory 5 are addressed in sequence by the line register 146 and a series of logic high voltages are generated at the Q terminal 156, and transmitted through the second OR gate 166 to the memory initiate terminal on the read-write memory 5. The instructions on the addressed lines are thus read out of the read-write memory 5 through the data read lines 6 and through the data bus 3 to the controller 1. When read-out of each instruction is completed, the memory busy bus 127 goes low to reset the first J-K flip-flop 150 through its direct reset terminal 160. Subsequent clock pulses advance the line register 146 to read the remaining instructions stored in the read-write memory 5 and the controller 1 performs its function accordingly.

If the controller 1 functions properly, the program stored in the read-write memory can be immediately transferred to the read-only memory 62. If not, however, specific instructions can be changed by dialing the appropriate line number into the line register 146 and manually entering a new instruction by means of the input unit 72. When a satisfactory program has been developed, transfer is initiated by rotating the mode selector switch 128 to its third position. In this mode, the read/write terminal 8 remains connected to the positive voltage terminal 130, but the positive voltage terminal 132 is now connected to the normally open push button 136. Transfer is initiated by depressing the normally open push button 136 causing a logic high voltage to be generated through the first OR gate 140 to the clock terminal 149 of the first J-K flip-flop 150, and through the register bus 144 to the line register 146. As a result, the line register 146 addresses a line in the read-write memory 5 and a corresponding line in the read-only memory matrix 62. Concurrently, a logic high voltage is generated at the Q terminal 146, which logic high is transmitted through the second OR gate 166 to the memory initiate terminal 9 on the read-write memory 5. The addressed instruction in the memory 5 is thus read out and appears on the data read lines 6. When the instruction is successfully read out to the data read lines 6, the memory busy bus 127 goes low to reset the first J-K flip-flop 150 and to simultaneously clock the second J-K flip-flop 151 through the first inverter circuit 169. A logic high voltage is thereby generated at the Q terminal 157 and is applied to the enabling terminal 64 on the clock pulse generator 35. The generator 35, therefore commences to generate 10 phase displaced pulses to the transfer circuit 10 and the instruction on the data read lines 6 is transferred, one bit at a time, through the transfer circuit 10 to the addressed line of the read-only memory 62. When the tenth clock pulse is generated, it is conveyed through the lead 68 to the second input terminal 178 on the NAND gate 176. Concurrently, the comparator circuit 65 operates to insure that the instruction has been properly stored in the read-only memory matrix 62. If properly stored, the comparator circuit 65 generates a logic high voltage through the enable bus 71 to the first input terminal 177 on the NAND gate 176. The resulting logic low voltage at the NAND gate output terminal 175 is applied to reset the second J-K flip-flop 151 through its direct reset terminal 161. The same logic low voltage is inverted by the third inverter circuit 174 and applied to the first input terminal 139 of the first OR gate 140 to automatically initiate another transfer cycle. Transfer continues until the entire program has been read out of the read-write memory 5, or until the read-only memory matrix 62 is fully loaded. The read-only memory matrix 62 is then unplugged from the programmer circuit and inserted into the controller 1.

We claim:

1. A programmer for a controller which operates in response to the instructions in a controller program to read the condition of input devices and to operate output devices, the combination comprising:

a read-write memory connectable to the controller;

an input unit connected to said read-write memory for entering an initial controller program into said read-write memory and making corrective changes therein;

first means connected to said read-write memory and said controller for sequentially reading the instructions of said controller program out of said read-write memory to operate said controller in accordance with the controller program stored in said read-write memory;

a read-only controller memory; and second means connected to said read-write memory for transferring each instruction of the program stored therein to said read-only controller memory.

2. The programmer as recited in claim 1 in which said second means includes a transfer circuit and a clock pulse generator and the program stored in said read-write memory is a series of instructions, wherein the program is read from said read-write memory to said transfer circuit in sequence, one instruction at a time, and each such instruction is transferred to said read-only controller memory, one bit at a time, in synchronism with pulses generated by said clock pulse generator.

3. The programmer as recited in claim 2 in which said second means also includes a comparator connected to said read-write memory and said controller memory, wherein said comparator verifies the accurate transfer of each instruction into the controller memory and initiates the transfer of the next instruction.

4. The programmer as recited in claim 3, wherein said read-write memory is a plated wire memory.

5. The programmer as recited in claim 3 which includes a line register connected to said read-write memory and said controller memory, said line register being operable to sequentially address lines in said read-write memory both when loading a program into the read-write memory and when operating the controller according to the loaded program, and said line register being operable to address corresponding lines in said read-write memory and controller memory when transferring the loaded program to said controller memory.

6. A programmer for a controller, the combination comprising:

a data bus;

a read-write memory having a set of read lines connected to the data bus, a set of write lines connected to the data bus, and a set of address terminals;

a clock pulse generator;

a transfer circuit connected to the data bus and being operable to convey digital signals appearing thereon to a set of output terminals, one bit at a time, in response to a set of clock pulses generated by said clock pulse generator;

a controller memory having a set of address terminals, and having a set of input terminals connected to receive and store the digital signals generated at the output terminals of said transfer circuit;

a line register connected to the address terminals on said read-write memory and controller memory, said line register being operable to address corresponding lines in said memories;

an input unit connected to said data bus and being operable to generate the program thereon, one instruction at a time, in response to input information; and a central control circuit connected to operate said programmer elements in one of three modes in accordance with the position of a mode selector switch, 1. to load instructions generated on said data bus into addressed lines of said read-write memory, 2. to operate a controller connected to said data bus by selectively reading addressed instructions out of said read-write memory, and 3. to transfer the program stored in said read-write memory to said controlled memory by successively reading addressed instructions out of said read-write memory to said transfer circuit and initiating the clock pulse generator to convey each bit of each instruction to an addressed line in aid controller memory.

7. The programmer circuit as recited in claim 6 which includes a comparator circuit connected to said controller memory, said data bus, and said clock pulse generator, said comparator circuit being operable to compare each instruction transferred to the controller memory with the corresponding instruction in the read-write memory, and connected to said central control unit to initiate transfer of the next instruction.

* * * * *

PO-1050
(5/69)

UNITED STATES PATENT OFFICE
CERTIFICATE OF CORRECTION

Patent No. 3,798,612                              Dated    March 19, 1974

Inventor(s)  Odo J. Struger and Joseph D. Radtke

It is certified that error appears in the above-identified patent and that said Letters Patent are hereby corrected as shown below:

| | |
|---|---|
| Column 2, line 3 | "connnected" should be -- connected --. |
| Column 2, line 40 | "soltuion" should be -- solution -- |
| Column 6, line 64 | "flop" should be -- flops -- |
| Column 7, line 35 | "drive" should be -- drives -- |
| Column 9, line 16 | "the" should be -- be -- |
| Column 10, line 3 | "pulses" should be -- pulse -- |
| Column 10, line 20 | "function" should be -- functions -- |
| Column 12, line 45 (Claim 6) | "aid" should be -- said -- |
| Column 12, line 54 (Claim 7) | "unit" should be -- circuit -- |

Signed and sealed this 1st day of October 1974.

(SEAL)
Attest:

McCOY M. GIBSON JR.
Attesting Officer

C. MARSHALL DANN
Commissioner of Patents